(No Model.)
E. GORSUCH.
TIRE TIGHTENER.
No. 551,956. Patented Dec. 24, 1895.
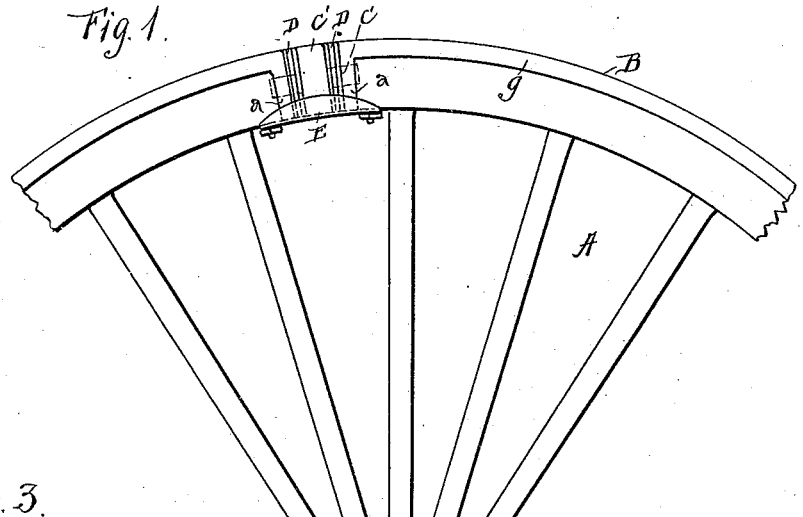
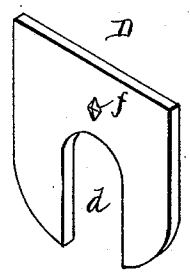
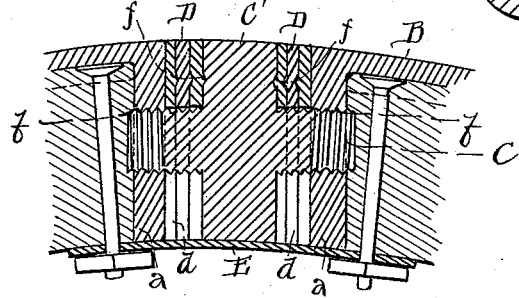
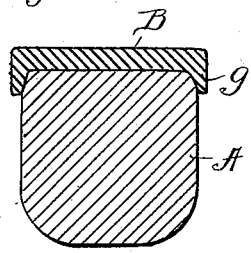
Witnesses:
Geo. M. Anderson
Phill. E. Masi.
Inventor:
Edward Gorsuch
by E. W. Anderson
his Attorney

UNITED STATES PATENT OFFICE.

EDWARD GORSUCH, OF ROARING SPRING, PENNSYLVANIA.

TIRE-TIGHTENER.

SPECIFICATION forming part of Letters Patent No. 551,956, dated December 24, 1895.

Application filed August 31, 1894. Serial No. 521,832. (No model.)

*To all whom it may concern:*

Be it known that I, EDWARD GORSUCH, a citizen of the United States, and a resident of Roaring Spring, in the county of Blair and State of Pennsylvania, have invented certain new and useful Improvements in Wagon-Tires; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a representation of an elevation of the invention applied. Fig. 2 is a longitudinal section of the invention. Fig. 3 is a detail of one of the washers. Fig. 4 is a cross-section of tire and felly.

This invention has relation to certain new and useful improvements in wagon-tires; and it consists in the novel construction and combination of parts, all as hereinafter described, and pointed out in the appended claim.

The object of the invention is to provide a tire having means whereby it may be secured upon a wheel without the use of the tire-bolts commonly employed, and without welding, and which can be quickly and easily tightened at any time with the aid of a wrench.

Referring to the accompanying drawings, the letter A designates a vehicle-wheel provided with my improved tire B, which I will now proceed to describe.

The two ends of the tire are provided each with an inwardly-turned flange $a$, the two flanges standing parallel with each other and formed with registering threaded perforations $b$.

C is a bolt which is employed to unite the two ends of the tire, and which has a right-hand thread upon one end portion thereof and a left-hand thread upon its opposite end portion, and between said oppositely-threaded portions a nut C', which is fixed with the bolt.

In applying this tire the felly is cut away to receive the flanges $a\ a$ and the bolt, the screw-threaded portions of the latter engaging respectively the threaded apertures in the said flanges. A wrench is then applied to the nut and the two ends of the tire drawn together as far as may be necessary, the nut being left in such position that its outer face or edge completes the tread-surface of the tire, being flush therewith. I usually employ upon each side of the nut one or more washers D, whose outer edges also are flush with and form part of the tread of the tire. These washers consist each of a small plate of metal, having therein an open slot $d$ to permit the washer to drop over the bolt. Should the tire become loose, one or more of these washers may be easily removed and the two ends of the tire drawn nearer together by the application of a wrench to the nut. Said washers are usually each provided with a small projection $f$ on one face thereof to prevent their turning on the bolt.

The tire has also at each lateral edge thereof a continuous inturned flange $g$, the two such flanges partially embracing the lateral faces of the felly. These flanges not only aid in securing the tire in place, but they also secure the fellies in place and prevent wear thereof.

The joint in the felly where the bolt C is located may be reinforced by a metal plate E on the inner face of the felly. The bolts which secure this plate in place extend through the felly but not into the tire.

By means of this invention the tightening of the tire may be effected without breaking the wheel down and without the necessity of taking it to a smith to have the tire cut and shrunk.

The slot plates or washers serve to gage the amount of draw on the tire, this being commonly a matter of guesswork, especially as to the amount of expansion of the tire and the strength of the wheel.

Having thus described my invention, what I claim as new, and desire to secure by Letters Patent, is—

The combination with the divided felly and the boltless tire having lateral flanges and its end portions bent downwardly to engage the ends of the said felly, said end portions extending the entire thickness of the felly, of a right and left threaded bolt engaging said end portions, and having a central, rigid nut portion of the same cross-section of that of the felly and tire combined, a series of slotted washers seated upon the said bolt upon each side of the nut, and seating flush therewith, said washers having the projections $f$ thereon, and the joint plate E which connects the two ends of the felly, at the under side, said plate being secured by bolts which extend through the felly but not into the tire, substantially as specified.

In testimony whereof I affix my signature in presence of two witnesses.

EDWARD GORSUCH.

Witnesses:
E. E. GREENE,
E. C. LOWER.